United States Patent [19]

Barber et al.

[11] Patent Number: 5,586,243
[45] Date of Patent: Dec. 17, 1996

[54] MULTIPLE DISPLAY POINTERS FOR COMPUTER GRAPHICAL USER INTERFACES

[75] Inventors: Ronald J. Barber; Daniel A. Ford, both of San Jose; Edwin J. Selker, Palo Alto, all of Calif.

[73] Assignee: International Business Machines Corporation, Armonk, N.Y.

[21] Appl. No.: 227,939

[22] Filed: Apr. 15, 1994

[51] Int. Cl.[6] ............... G06F 15/00; G09G 5/08
[52] U.S. Cl. ............ 395/326; 395/352; 345/145
[58] Field of Search .................. 395/155–161; 345/145, 147

[56] References Cited

U.S. PATENT DOCUMENTS

| 4,072,851 | 2/1978 | Rose | 364/487 |
|---|---|---|---|
| 4,190,835 | 2/1980 | Buynak | 340/750 |
| 4,454,507 | 6/1984 | Srinivasan et al. | 340/744 |
| 4,625,202 | 11/1986 | Richmond et al. | 340/709 |
| 4,807,182 | 2/1989 | Queen | 364/900 |
| 4,841,291 | 6/1989 | Swix et al. | 340/725 |
| 4,859,995 | 8/1989 | Hamen et al. | 340/710 |
| 4,884,068 | 11/1989 | Malheny et al. | 340/707 |
| 4,951,038 | 8/1990 | Yamamura | 340/725 |
| 4,984,152 | 1/1991 | Muller | 364/200 |
| 5,060,135 | 10/1991 | Levine et al. | 364/200 |
| 5,179,656 | 1/1993 | Lisle | 395/159 |
| 5,185,597 | 2/1993 | Pappas et al. | 340/709 |
| 5,487,145 | 1/1996 | Harsh et al. | 395/162 |

OTHER PUBLICATIONS

"Multi–Pointer Mouse" IBM, TDB, vol. 37, No. 10, pp. 13–14, Oct. 1994.
"Microsoft's Mouse That Roars Is On The Loose", *San Jose Mercury News, Computing*, by Peter H. Lewis, Sunday, May 2, 1993.

Primary Examiner—Raymond J. Bayerl
Assistant Examiner—A. Katbab
Attorney, Agent, or Firm—Baker, Maxham, Jester & Meador

[57] ABSTRACT

A pointer system provides multiple display pointers that can be created and identified by a computer user such that each pointer is associated with a particular application and location within an application. A user can recall respective pointers and pointer locations by selecting a pointer identifier. One or more of the pointers can be defined as anchored pointers, which are associated with one or more user actions. The user actions can comprise a variety of functions, including mouse button clicks. In this way, a user can define anchored pointers and carry out a string of user actions by selecting the identifying character of an anchored pointer.

4 Claims, 15 Drawing Sheets

| LABEL | HANDLE | ACTION | NEXT ACTION |
|---|---|---|---|
| Label 1 | Object 4 | Button 1 | + |
| Label 1 | Object 2 | Key 12 | |
| Label 2 | Object 5 | Button 2 | |
| ⋮ | ⋮ | ⋮ | ⋮ |
| Label n | Object n | Key n | |

MULTIPLE DISPLAY POINTERS FOR COMPUTER GRAPHICAL USER INTERFACES

BACKGROUND OF THE INVENTION

1. Field of the Invention

This invention relates generally to graphical user interfaces and, more particularly, to control of computer activities with graphical user interface pointing devices.

2. Description of the Related Art

The interactive computer system operating environment, such as encountered by users of personal computers and the like, is characterized by increasing ease of operation and convenience. An important contribution to making the operation of such computers easier and more convenient is the graphical user interface (GUI). A GUI provides a computer interface that is visually oriented and includes a variety of graphical artifacts displayed on a computer display that make the operation of the computer more intuitive and thereby can increase the efficiency of the user.

A GUI operating system enables a user, for example, to move a computer display pointer by using a GUI pointing device such as a display mouse or track ball that is attached to the computer. Generating a control input by moving the mouse across a desktop or rolling the track ball in its cradle moves the pointer across the display in the same direction of movement, according to a response function of the pointing device. The relationship between pointing device control input and pointer response on the display screen is intuitive. Most GUI systems permit multiple programs to be represented simultaneously on the computer display as different display windows. The boundaries of the windows can be adjusted or can be reduced to an icon representation. To activate a program, or to re-enter it, a user targets the display pointer within the desired program window or targets the display icon representing the program and presses a button of the display mouse or track ball device. Pressing the button, also referred to as "clicking" it, activates or re-enters the program. To activate a program without the GUI, a user would need to type the name of an executable file and provide it to the operating system. In this way, the keystrokes needed to activate or re-enter a program are eliminated or at least severely reduced, making the computer easier and more convenient to use. Pointing to a desired activity is highly intuitive and therefore makes learning the operation of the computer easier and more convenient.

Additional improvements to program interaction through graphical user interface display pointer control are rapidly being achieved. For example, International Business Machines Corporation (IBM Corporation) has introduced a display pointer control feature called "TrackPoint II" that includes a small, substantially rigid joystick-type actuator placed approximately in the center of an otherwise conventional computer keyboard. The "TrackPoint II" control actuator is placed approximately in the middle of the keyboard, between the hands of a typist at the home position, and is sufficiently short so it does not interfere with normal typing on the keyboard. A computer user can apply lateral forces to the control actuator to move the pointer around on the computer display, rather than using a display mouse. The keyboard provided with the "TrackPoint II" feature preferably includes buttons that duplicate the function of the display mouse buttons. In this way, the user's hands do not need to leave the keyboard to control the display pointer. This feature is especially desirable in a portable computer, known as a laptop or notebook computer, having a graphical user interface, where it can be inconvenient or difficult to connect a mouse or track ball to the computer to control display pointer movement. The IBM Corporation notebook computer called "ThinkPad 750", for example, includes a "TrackPoint II" control actuator.

On occasion, it can be advantageous to have control of more than one display pointer because, as noted above, graphical user interfaces permit multiple programs, or windows, to be active and displayed at the same time and it could be useful to have a different pointer for different windows. In addition, even within a single window there will likely be features or artifacts with which it might be advantageous to place a pointer that remains even after the user exits that window. Thus, multiple pointers would provide place markers that would be recalled when the user returns to the window.

It is known to provide a computer workstation for computer aided design (CAD) with both a movable pointer that is controlled by a display mouse and a movable cursor that can be moved across a display window with a tablet device. Although such a CAD workstation system provides a pointer and a cursor that can be controlled independently, the system does not provide desired flexibility in that the pointer responds only to the display mouse and the cursor responds only to the tablet. In addition, the cursor typically is limited to movement about designated windows and cannot be moved across the entire display screen. Finally, it typically is not possible to use additional pointers or cursors other than the two provided by the workstation configuration.

It would be advantageous to permit greater exploitation of the operating ease and efficiency obtained through the GUI environment by providing multiple pointers. For computers that do not support a GUI operating environment, it still would be advantageous to have the use of multiple pointers that can be created and manipulated by the computer user. Such multiple pointers could be used as place markers within a single text file. For the typical personal computer system, it could be possible to attach multiple pointing devices, but they still would control only the single pointer provided by most operating systems. In addition, only a limited number of pointing devices can be attached, due to the limited number of device hardware serial ports that are available. For example, most personal computers are capable of accommodating, at most, two display devices. Finally, it would be preferable to minimize the amount of additional equipment and hardware modification necessary to the personal computer design to provide multiple pointers.

From the discussion above, it should be apparent that there is a need for a pointer system for computers such that multiple display pointers can be created, manipulated, and easily distinguished from each other. Such a pointer system would permit easier and more convenient control of operations without being constrained by the limitations of hardware ports and desktop space. The present invention satisfies this need.

SUMMARY OF THE INVENTION

In accordance with the present invention, a pointer system for a computer with a pointing device provides multiple display pointers that can be created and labelled by a computer user such that each pointer remains associated with a particular pointer context comprising a display screen location, even when the user changes the display, until the user deletes the pointer. The pointers are preferably labelled by a user with a single alphanumeric character of the keyboard, which is displayed in close proximity to the associated pointer on the display screen. The label quickly distinguishes each pointer and permits affirmative designation and recall of desired pointers. In this way, a user can define, identify, and manipulate a number of display pointers, thereby increasing ease and convenience of computer operation. Different computer functions can be easily selected without moving the display pointer. In another aspect of the invention, a user can define anchored pointers that remain fixed in a specific location of an application or document as the display is changed and that can be associated with user actions, such as selection actions that otherwise would require "clicking" a pointing device button.

The pointer system can be implemented in a variety of operating systems with both window applications and non-window applications. In a computer system that operates with a graphical user interface environment operating system that supports multiple windows, the pointer system in accordance with the present invention permits a user to select an anchored pointer in one GUI window from an active pointer location in another GUI window, such that the GUI window is closed, operation is moved to the anchored pointer destination, and the user actions associated with the anchored pointer are performed. In this way, relatively complicated and involved actions, such as program launch commands, editing commands, or other executable routines, can be defined and then initiated from anywhere within the computer operating system.

In accordance with the invention, multiple display pointers can be manipulated and easily distinguished as a user moves from document to document or window to window so that easier and more convenient control of operations through multiple documents and windows are possible without constraint from limitations such as the number of computer hardware ports and available space for multiple display control devices. In addition, multiple anchored pointers can be defined and selected to reduce the number of operations required for a user to execute repetitive tasks.

Other features and advantages of the present invention should be apparent from the following description of the preferred embodiment, which illustrates, by way of example, the principles of the invention.

BRIEF DESCRIPTION OF THE DRAWINGS

FIG. 8 is a representation of a data structure used in the computer system illustrated in FIG. 1.

DESCRIPTION OF THE PREFERRED EMBODIMENTS

Figure 1:
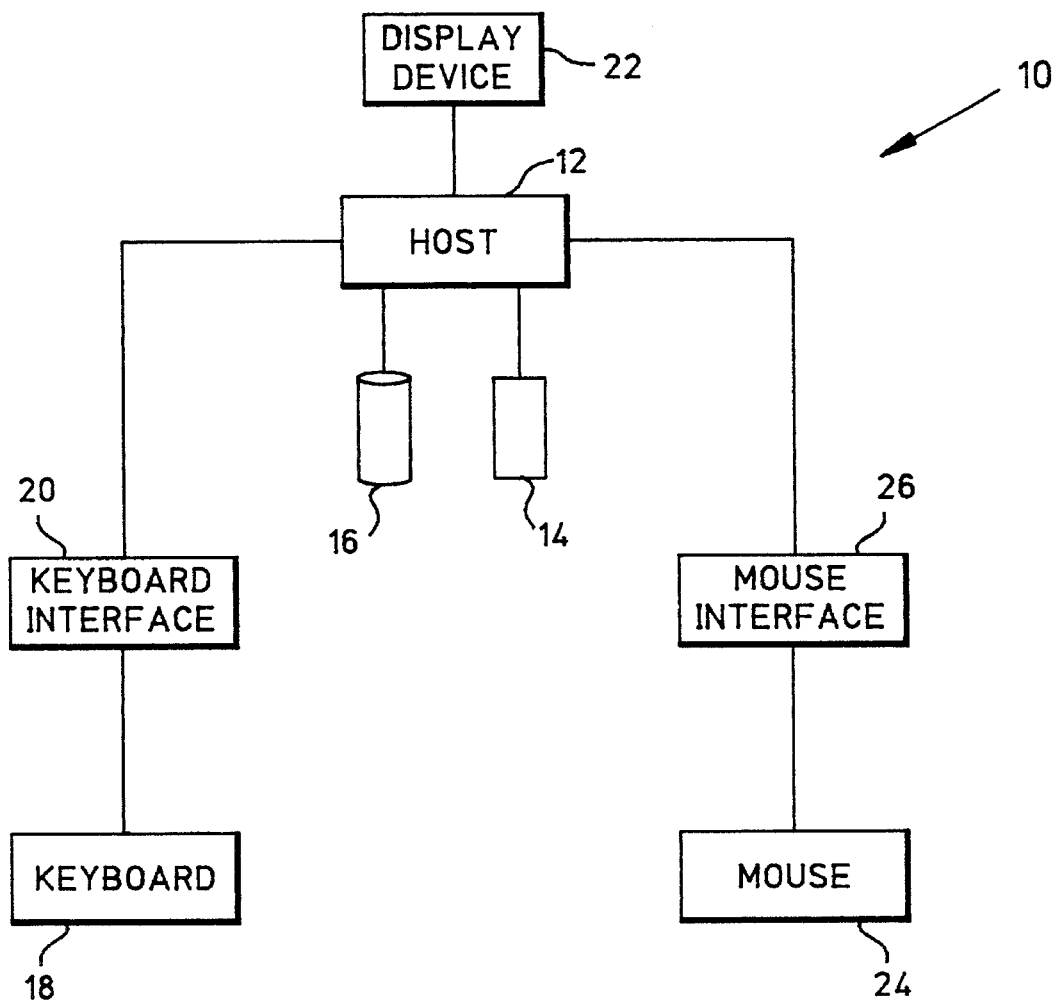
FIG. 1 is a block diagram of a computer system constructed in accordance with the present invention.

FIG. 1 is a block diagram of a computer system 10 constructed in accordance with the present invention. The computer system includes a host processor 12 that stores data in an operating random access memory 14 and peripheral data storage 16. Computer system processing and communication with a computer user is initiated through a keyboard 18, which interfaces to the host processor via a keyboard interface 20. A display device 22, such as a video terminal, displays computer output and system operations. Manipulation of display objects takes place by using a display mouse device 24 that is connected to the host processor via a mouse interface 26. In the preferred embodiment, the computer system 10 includes an operating system with a graphical user interface (GUI) that provides a window operating environment, which is well-known to those skilled in the art and requires no further explanation. The GUI program instructions reside in the operating memory 14 and the data storage 16. It should be understood, however, that the present invention has equal application to non-window operating environments, including what are commonly referred to as DOS systems or DOS applications for personal computers.

The host processor 12 can comprise any one of many platforms, including the IBM Corporation PS/2® personal computers, RS/6000 workstations, and the like. The peripheral data storage 16 comprises direct access storage devices such as hard disk drives and floppy disk drives. The display mouse device 24 can be substituted with other devices that provide the same function and control, such as a track ball or joystick (not illustrated), which are well-known to those skilled in the art and require no further explanation. Thus, references to the display mouse will be understood to include alternative devices such as track ball and joystick controllers. Likewise, references to mouse buttons and other mouse features will be understood to include equivalent mechanisms for track balls, joystick devices, and the like.

Figure 2:
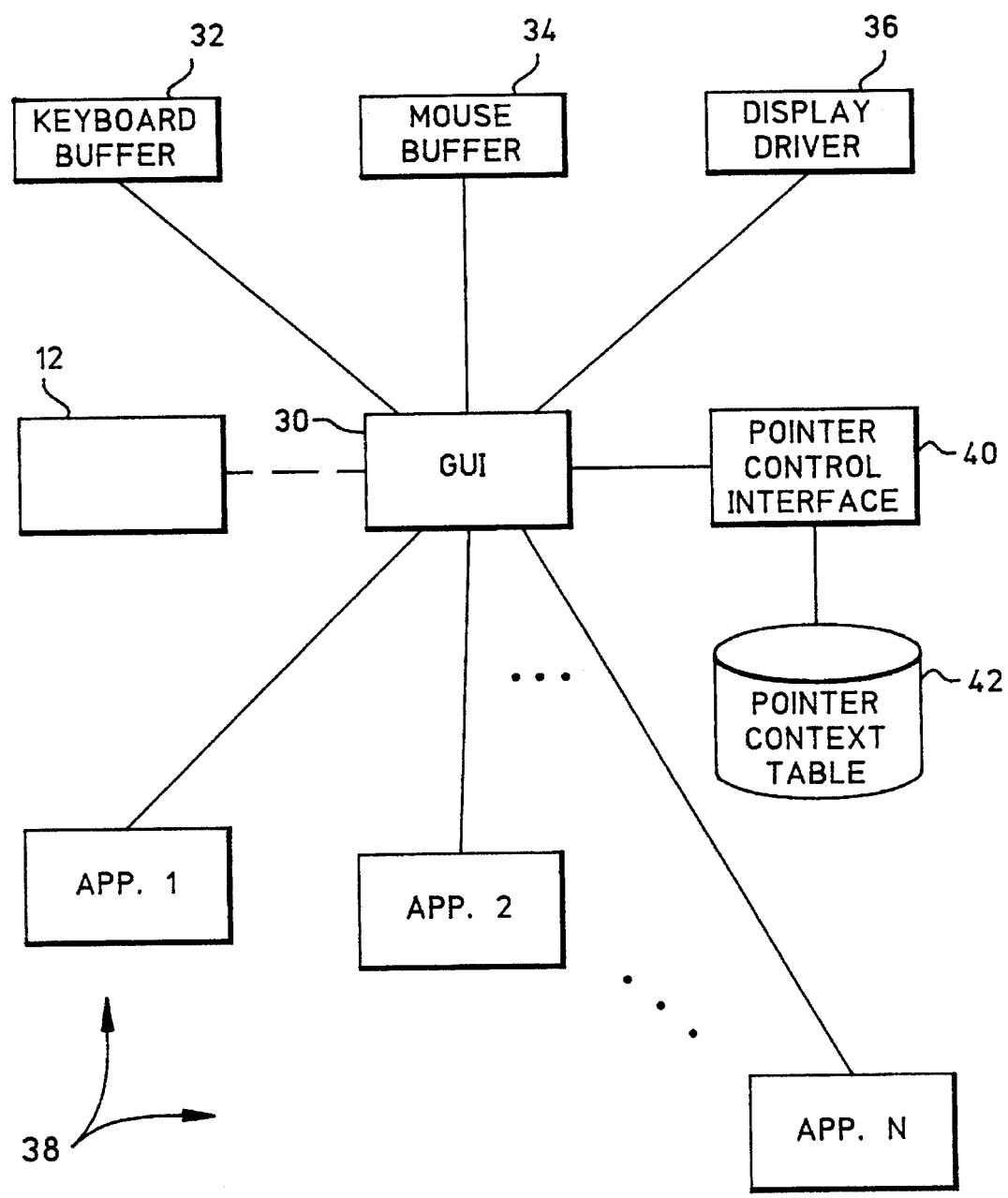
FIG. 2 is a block diagram showing the graphical user interface and other components of the system illustrated in FIG. 1.

FIG. 2 illustrates the operating configuration of the GUI 30. The GUI is implemented in the host processor 12 and operating memory 14 illustrated in FIG. 1, but is represented as a separate block in FIG. 2 to emphasize that its function is to provide an interface between the computer user and the processor. The GUI 30 receives keyboard input from a keyboard buffer 32 and receives display mouse input (or track ball or joystick input) from a mouse buffer 34. As known to those skilled in the art, keystrokes and display device input can be stored in the respective buffers until the host processor is ready for the input. As the GUI receives such input information and the host processor carries out requisite processing, the GUI maintains the display on the display device 22 via a display driver 36. The GUI uses the window operating environment to support a plurality of application programs 38. As described further below, the GUI 30 of the present invention supports multiple display pointers through a pointer control interface 40 and a pointer context table 42.

Figure 3:
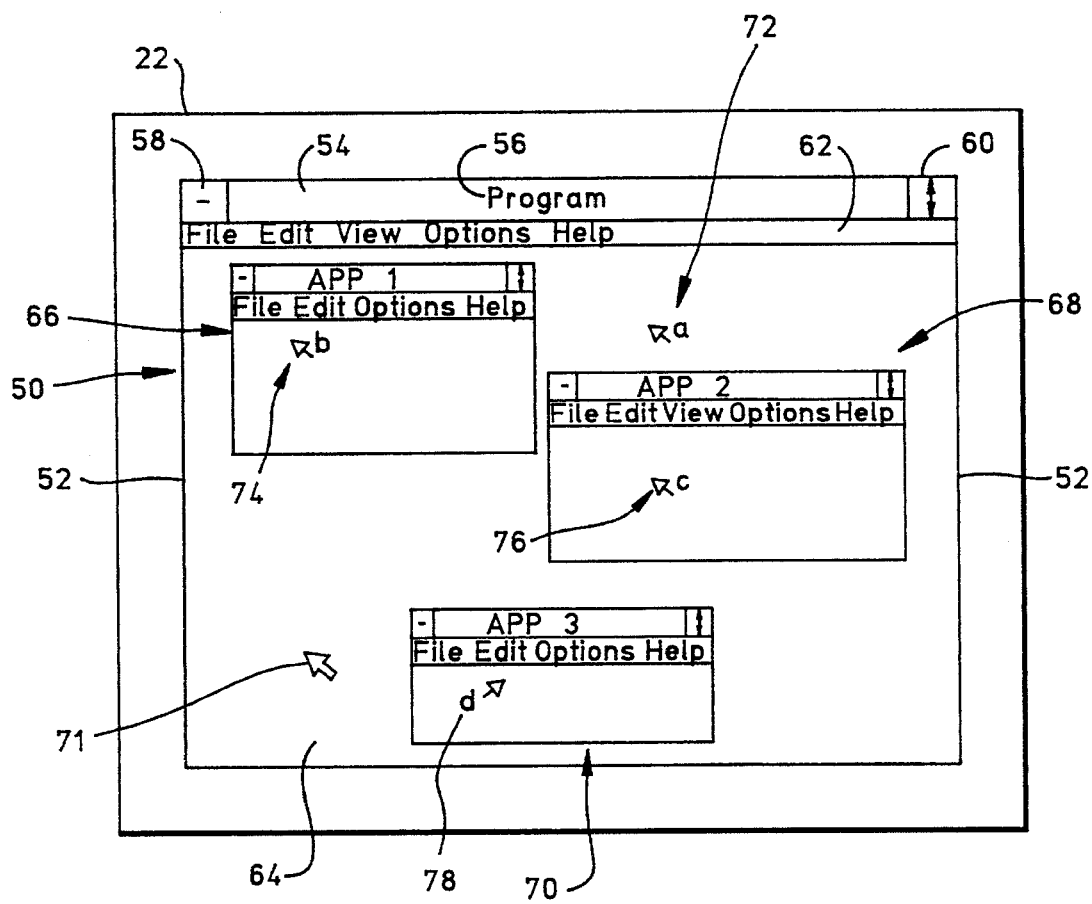
FIG. 3 and FIG. 4 are display representations illustrating multiple pointers of the system illustrated in FIG. 1.

FIG. 3 is a representation of a display image that illustrates the window operating environment supported by the GUI 30 of the preferred embodiment, as displayed on the video terminal 22. Those skilled in the art will appreciate that the GUI provides a multi-level operating environment in which multiple application programs and documents, or windows, can be active at the same time. The FIG. 3 representation comprises a system management program display window 50 having a window frame 52 and a title bar 54. The title bar includes a title 56, a menu icon 58, and a window sizing icon 60. Beneath the title bar is a menu bar 62 showing drop-down menu selections entitled "File", "Edit", "View", "Options", and "Help". Those skilled in the art will recognize that these display window elements are generated by the GUI.

Within the program display window 50 is displayed a window working space 64. Displayed within the window working space 64 are further windows 66, 68, 70 that correspond to application programs that have been activated, or launched, by a system user. Each of the application windows therefore includes a window menu icon, a window title bar, and a window sizing icon similar to those described above for the program window. A conventional, default display pointer 71 is shown in the working space 64 of the program window 50. Other display pointers, which are labelled, also are illustrated in FIG. 3. For example, the working space of the program window 50 includes a movable pointer 72 identified with the character "a" located adjacent the pointer. The first application window 66 includes a movable pointer 74 identified with the letter "b" adjacent the pointer. The second application window 68 includes a movable pointer 76 identified by the letter "c" adjacent the pointer. Finally, the third application window 70 includes a movable pointer 78 identified with the letter "d" located adjacent the pointer.

The active pointer 71 is readily distinguished from the other pointers because the GUI 30 displays the active pointer in a distinctive manner. For example, in the preferred embodiment, the active pointer is larger than the other illustrated pointers. The window containing the active pointer is called the focus window. In the preferred embodiment, a single display mouse is used to move the pointers. Therefore, when the mouse is moved, the active pointer in the focus window is the only pointer that moves.

A user of the computer system 10 can control movement of the various pointers using the mouse display device 24. In the preferred embodiment, the pointers are implemented in a GUI window environment and continue to exist outside of the particular application windows in which they were first defined. Thus, just as the default (unlabelled) pointer 71 can be moved across the entire display screen 22, from application window to application window, the other pointers also can be moved outside of the frame boundary of their respective defining application window to other windows. Alternatively, the movable pointers can be implemented such that they do not exist outside of the application window in which they were first defined. If such is the case, then a movable pointer will come to a stop when it reaches the boundary of its respective window frame even if the user continues to move the controlling display mouse further across the workspace.

Figure 4:
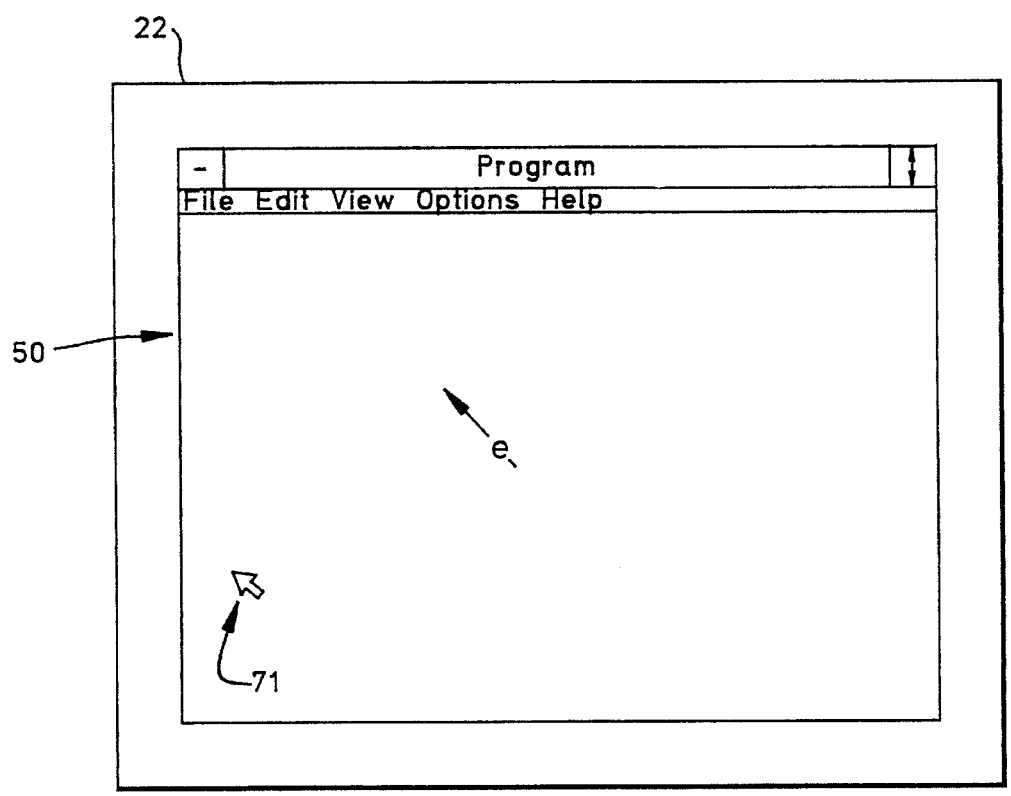

The multiple pointers 72–78 can be identified and labelled in a variety of ways. In the preferred embodiment, the identification is by means of an alphanumeric character selected from among the keys of the keyboard 18. Restricting the identification to alphanumeric keys reduces the confusion that might otherwise result from using special keys whose display representation would not be immediately clear or would be cumbersome, such as special function keys. The pointer identification character preferably is displayed adjacent the respective pointer, as illustrated in FIG. 3, and maintains its relative position as the pointer is moved about the window. Those skilled in the art, however, will recognize that alternative schemes can be used. For example, FIG. 4 illustrates an embodiment in which the identifying character is placed on top of the tail of the pointer. Again, this configuration is maintained as the pointer is moved about the window.

In the preferred embodiment, the GUI 30 keeps track of the various movable pointers that are defined by a user. The GUI keeps the responses of pointers separate so that a user does not become confused about which movable pointer is being controlled and so that no inadvertent command causes one of the pointers to unexpectedly appear or disappear on the display screen. In the preferred embodiment, the system keeps track of the multiple pointers through a pointer context table, which associates each pointer with sufficient information to specify the pointer position on the display screen 22.

As noted above, in the preferred embodiment the operating system comprises a GUI 30 that provides a window operating environment. In the case of a window environment, entries in the pointer context table include the title on the title bar of the application window including the application name and document name, a graphical object handle, and the approximate display coordinates for the pointer within the application window. The display coordinates, for example, can be provided in terms of distance along the horizontal and vertical axes of an application window frame.

Those skilled in the art will appreciate that the window graphical object handle comprises a predetermined identification of a window feature or artifact. For example, those skilled in the art understand that the GUI 30 assigns standard identification numbers or labels to objects such as sizing icons, drop-down menu bars, display "buttons," and other window artifacts that can be selected and activated with a mouse button click. These identification labels comprise the graphical object handles placed in the pointer context table. Referencing a graphical object handle permits the GUI to precisely identify a particular display feature. Thus, even the program window workspace 64 is assigned a unique, predetermined graphical object handle.

For an application that does not operate in a window environment, the pointer context table includes no window object artifacts or table entries set to default values. Rather, the pointer context table would reference pointer position by display screen coordinates. The table also could include application identification, including the application name and document name.

Figure 5:
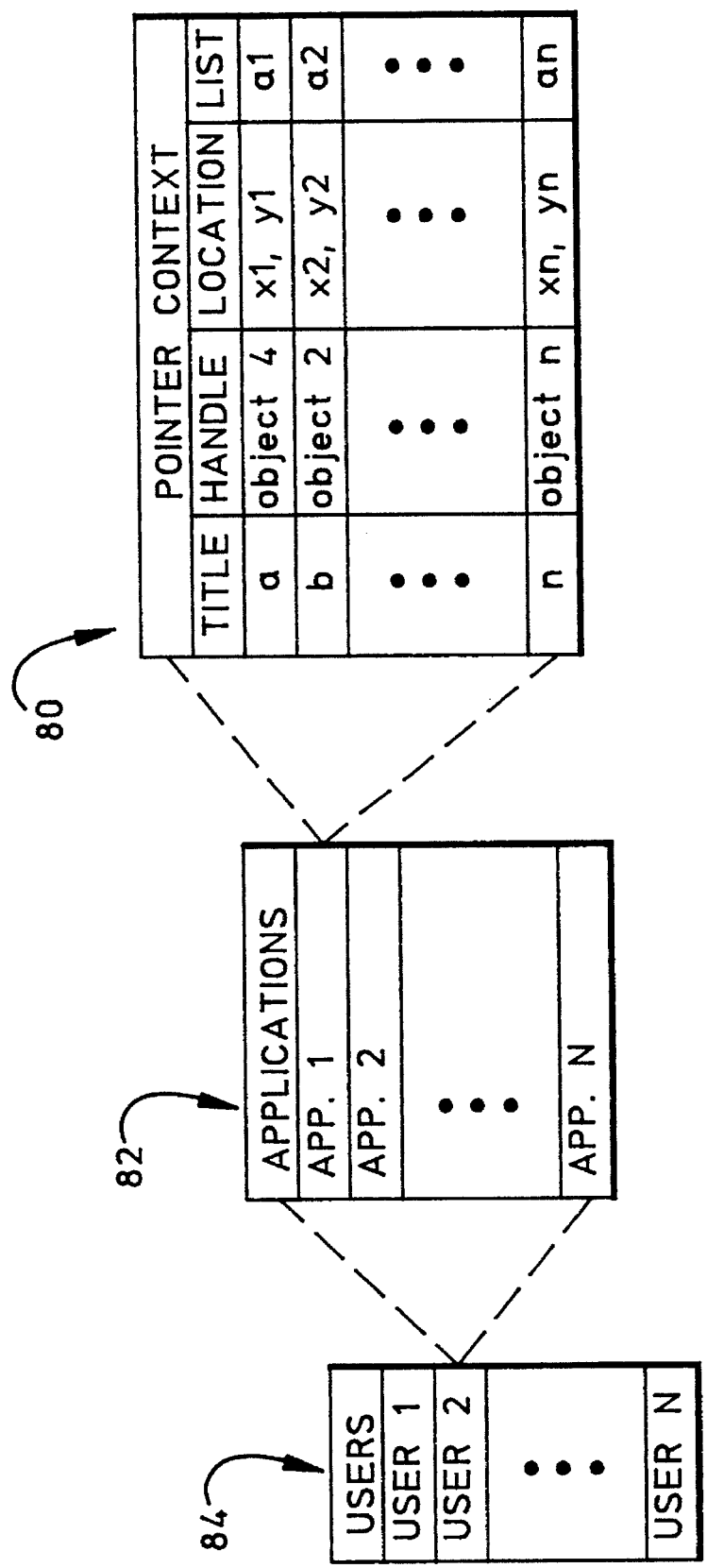
FIG. 5 is a representation of data structures used in the computer system illustrated in FIG. 1.

As illustrated in FIG. 5, a pointer context table 80 for the window environment provided by the GUI 30 is indexed according to a table 82 of the applications 38 currently active in the system 10. That is, each application has a separate pointer context table for its associated pointers. FIG. 5 shows the pointer context table for one of the applications. For a system having multiple users communicating over a network, each user will work within a separate operating system that will keep a pointer context table. Alternatively, FIG. 5 shows that the host computer for the network can maintain a table of users 84 associated with active applications, each user being associated with applications, which in turn will be associated with a pointer context table. The column headings in the pointer context table 80, as illustrated in FIG. 5, include columns for window label or title, graphical object handle, pointer location, and action list.

As noted above, the window title in the pointer context table 80 corresponds to the title of the particular application, such as the name of a word processing application program, a window management program, or a device management program. The window title also can include the title of a particular document or data structure being accessed by the application program. The graphical object handle can be associated with, for example, a predetermined word processing menu button. The pointer location in the table 80 corresponds to the horizontal and vertical coordinates of the current pointer location within the application window. The location is preferably given in terms of relative horizontal and vertical position with respect to the window frame. It should be appreciated that the pointer location coordinates in the context table will change as the pointer is moved in the window. Finally, the column labelled list relates to an action list, a feature of the anchored pointer, which is described further below.

It is not necessary for the pointer system to update the pointer context table 80 at frequent intervals. Those skilled in the art will appreciate that the mouse driver interface 26 instantaneously updates the pointer location as the pointer is moved across the display 22, so that it is not necessary for the pointer context table to contain such information. That is, the instantaneous pointer location is determined by another system of the computer 10 and need not be determined or maintained by the pointer context table of the pointer system. The pointer context table will be referenced, and therefore need be updated, only when a computer user changes the pointer that is being controlled or closes a particular document, application, or window.

In the preferred embodiment, the pointer context table entry for a pointer is deleted when the document or application that is associated with the pointer, or that "owns" the pointer, is closed. For example, the pointer context table entry for a pointer in a non-window operating system includes an application identification comprising the name of a document or file that owns the pointer and in a window operating system includes a window, application, and document identification for the owner of the pointer. In either case, if the owning application or window is closed, then the corresponding pointer entry in the table is deleted. Thus, the pointer is eliminated from the display, along with the closed application or window.

Alternatively, the system can save the pointer entry when the owning application or window is closed. If the owning application or window is re-opened, then the system finds the pointer entry in the pointer context table and re-displays the pointer in the appropriate location. In a third alternative, a pointer is re-owned to any underlying application or window when the present owner is closed. For example, in some non-window applications, multiple documents may be opened or in a window environment multiple windows may be opened and layered on top of one another. When one document or window is closed, the underlying document or window is exposed. In the third alternative, the pointer entry in the pointer context table is updated when an owning document or window is closed such that the owning document or window name is the name of the newly exposed, underlying document or window. If desired, the system can permit the user to select from among these alternatives when the user installs the system or otherwise configures the system in accordance with the invention.

Figure 6:
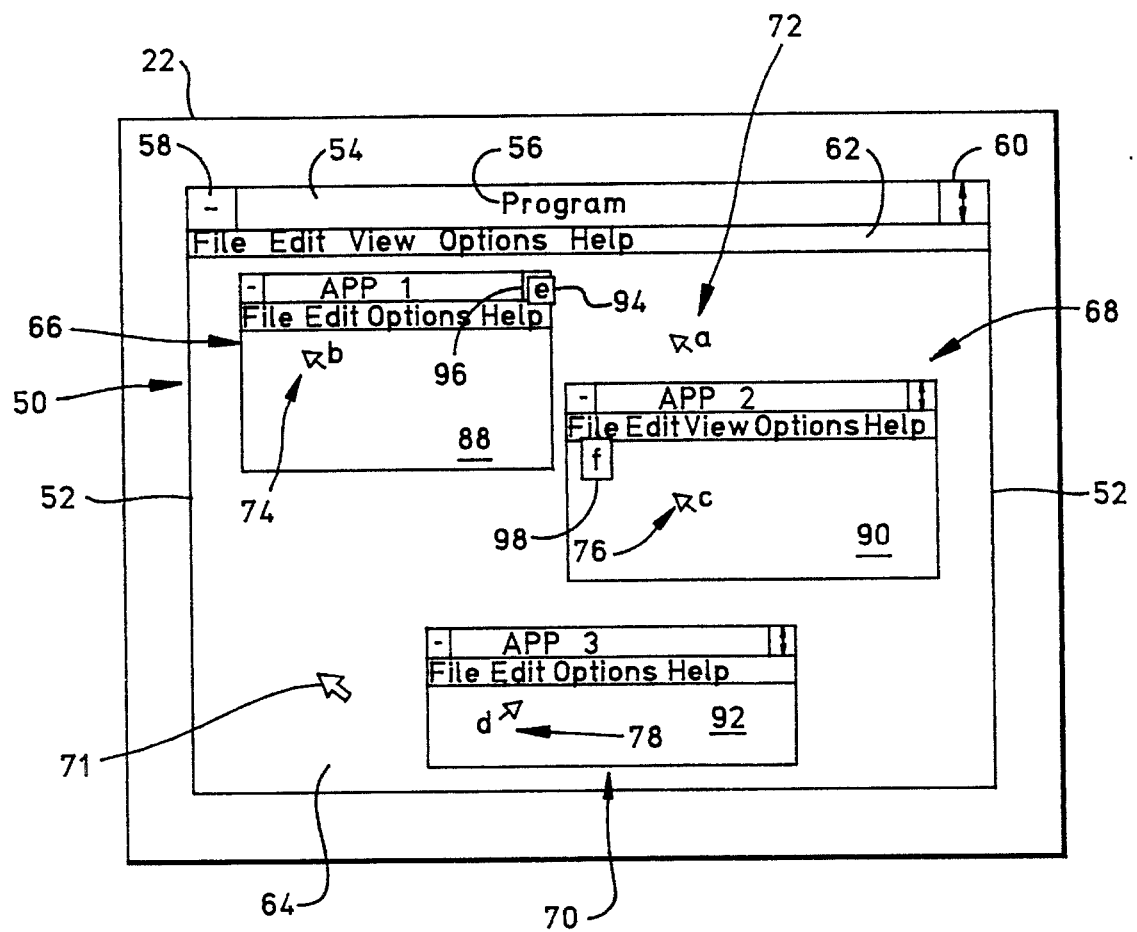
FIGS. 6 and 7 are display representations illustrating movable and anchored pointers of the system illustrated in FIG. 1.

FIG. 6 is a representation of a display screen 22 with a program window 50 representing a system management program performing a program management function and having a working space 64 within which three active application windows 66, 68, 70 are contained. Each application window 66, 68, 70 includes a working space 88, 90, 92, respectively. Within the working spaces of the application windows are contained various multiple display pointers, including movable pointers and anchored pointers described further below. All of the pointers are labelled with an alphanumeric character. The anchored pointers are distinguished from the movable pointers by having a different symbology. For example, in the preferred embodiment, a movable pointer comprises a pointer with an identifying character located adjacent to the pointer and an anchored pointer comprises an identifying character enclosed within a box.

Thus, in FIG. 6, the workspace 64 of the program manager window 50 includes the default GUI pointer 71, which is unlabelled. Also contained within the workspace of the program manager window is the movable pointer 72 identified with the letter "a". Contained within the workspace 88 of the first application window 66 is the movable pointer 74 identified with the letter "b" adjacent the pointer and also an anchored pointer 94 labelled with the letter "e" in a box comprising the anchored pointer symbol. The anchored pointer is located approximately on the window sizing icon 96. The second application window 68 contained within the program manager workspace 64 includes the movable pointer 76 identified with the letter "c" adjacent the pointer and also an anchored pointer 98 labelled "f" within a box located approximately on the "File" drop-down menu box. The third application window 70 contains only the movable pointer 78 identified with the letter "d" adjacent the pointer.

Figure 7:
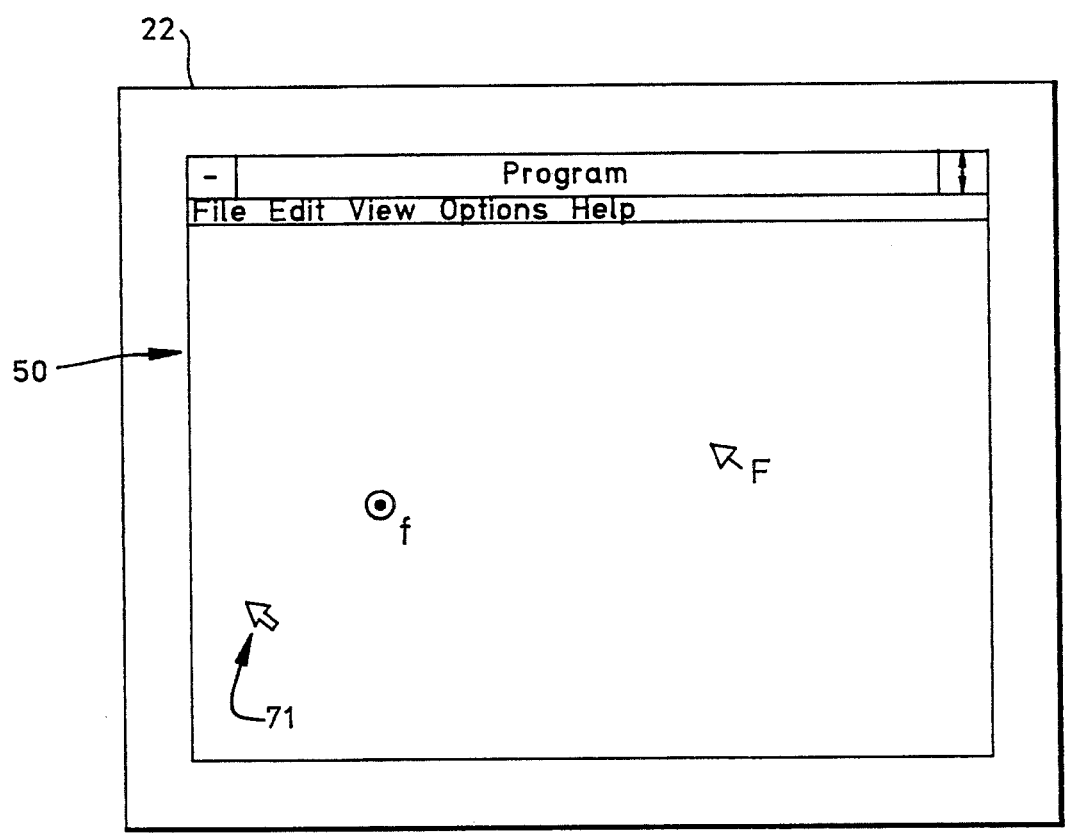

A variety of different schemes can be used to represent an anchored pointer, a few of which are illustrated in FIG. 7 as examples. A first alternative, for example, comprises an identifying letter located adjacent symbology comprising a dot enclosed within a circle. A second alternative comprises a pointer with a different identifying character, namely, an uppercase character. Those skilled in the art will appreciate that many other different symbologies can be used, as long as an anchored pointer can be easily distinguished from a movable pointer.

As noted above, anchored pointers can be associated with a user action or a sequence of user actions. The user actions can comprise, for example, pressing or clicking the display mouse buttons or analogous keyboard buttons. As known to those skilled in the art, a display mouse click can be used to actuate various icons and graphical objects that will resize application windows, launch programs, and perform a variety of other system tasks. The GUI 30 in accordance with the invention must be able to associate the user actions desired by a user with corresponding anchored pointers and must be able to retrieve the associated user actions when demanded by the user. In the preferred embodiment, these functions are provided by the pointer context table 80 referred to above in conjunction with the GUI 30.

FIG. 8 is a representation of an action list 100 for an anchored pointer. As noted above, the action list is referenced from the pointer context table 80. If the "action list" column in the pointer context table for a particular multiple pointer label contains no data, then the pointer is simply a movable pointer and is not associated with any user actions. If, however, the action list column in the pointer context table contains data, such as a label address, then the GUI 30 knows that the pointer is an anchored pointer and that the table data references an action list comprising one or more user actions that are associated with the corresponding pointer.

As illustrated in FIG. 8, the action list for an anchored pointer includes fields for the anchored pointer label, graphical object handle, user action, and next action. The location of the pointer is specified from the pointer context table 80 and the user action specifies the action to be taken. The data in the user action column, for example, corresponds to the data stored in the keyboard buffer or display mouse buffer for the desired action. The next action column allows a user to chain together a sequence of user actions that are executed when the user selects the associated anchored pointer. The table contains entries in the order in which they are to be performed. Thus, a sequence of entries having the same label will be performed in the order in which they are listed in the table.

Figure 9:
FIG. 9 is a table illustrating the actions that can be performed with the graphical user interface illustrated in FIG. 2.

FIG. 9 comprises a table 102 that explains how the GUI in accordance with the invention permits a user to define multiple pointers, both movable and anchored, and to use those pointers. The various functions that can be performed are listed in the first column and include actions such as Define, Define with Replace, Delete, and so forth. These features will be explained, in turn. The next column of the table lists features associated with the anchored pointers. The last column of the table 102 lists features associated with multiple (unanchored) pointers. The entries under the anchored pointer and multiple pointer columns refer to sequences of key presses. It should be understood that the particular keys pressed to implement functions are for purposes of illustration only. Other keys could be selected to implement the listed functions. Additional functions also may occur to those skilled in the art. It is to be understood that the name of a key indicates that the associated key is to be pressed and then released. The features listed along the first column will then be implemented by the GUI 30.

For example, to define an anchored pointer, the entry in the FIG. 9 table 102 specifies the "Ctrl" key, a pointer identification key, followed by an action. These key sequences indicate that the keyboard control key is to be pressed and then released, followed by a pointer identification key selected from among the alphanumeric keys of the keyboard, which is then released, followed by an action, which is a keystroke action comprising either a single key, a multiple-key action sequence (such as "Alt" followed by "F1" or "Ctrl" followed by "c"), or a single mouse button click, a press of the "Enter" key, and so forth. Similarly, a movable (unanchored) pointer is defined by first pressing the left shift key and then releasing it, followed by pressing and releasing an alphanumeric key. In either case, the GUI 30 causes the defined anchored or movable pointer to appear superimposed at the location of the default pointer. In the case of the anchored pointer, the default pointer can then be moved away from the anchored pointer, which remains behind. In the case of a movable pointer, control passes from the default pointer to the defined movable pointer, which then can be controlled with the mouse.

On occasion, it may be desirable to define an anchored or movable pointer and replace any previously defined pointer associated with the same identification label. This feature is referred to as a Define with Replace feature, specified in the second row of the table 102 in FIG. 9. As illustrated in the table, the key sequences for the respective types of pointers are the same as for defining a pointer, with the exception of pressing the "Insert" keyboard key in the defining sequence. The Delete feature listed in the table refers to deleting a pointer-key binding previously defined by the user. The Switch-To function listed in the table refers to changing the pointer controlled by the mouse from the current pointer to the pointer specified in the Switch-To key sequence. For example, if a user is presently controlling the default pointer and wishes to begin controlling the movable pointer identified with the letter c, then the user presses the left "Shift" key followed by the "c" key.

In a particular feature of the movable pointer, attempting to select an undefined movable pointer by specifying a pointer identification character not associated with a previously defined movable pointer results in the GUI 30 creating a movable pointer having the selected character binding. That is, a movable pointer will be defined by default and will be given the label to which the user attempted to transfer. Thus, when a user attempts to switch to a movable pointer by specifying an identification character, the GUI will search the pointer context table 80 for the entry corresponding to the specified alphanumeric key and, if the GUI does not find such an entry, creates a movable pointer binding for the key. In this way, a user can define movable pointers on the fly, simply by designating pointer labels that have not previously been defined. As with the define function, the new movable pointer is located adjacent the currently active pointer. It should be noted that there is no default defining feature for a user who selects an anchored pointer with an undefined label. This feature is not provided for the anchored pointers because it typically is undesirable to associate a default user action with a user anchored pointer. Therefore, it takes a deliberate act on the part of the user to define an anchored pointer.

The Append function listed in the FIG. 9 table 102 is associated with anchored pointers. The Append function is used to add actions to the action list of an anchored pointer. This feature is provided because the actions associated with the action list comprise a single key press. It sometimes is desirable to permit multiple key presses to be associated with an anchored pointer. For example, it may be desirable to permit double mouse button clicks. The Append function permits a user to add key presses to an anchored pointer action list. During an anchored pointer definition sequence, a user simply presses and releases the "Ctrl" keyboard key, followed by the alphanumeric identification key, followed by the desired action. In this way, the user can define a string of actions for as long as is necessary to perform a desired action. The Perform function permits a user to cause the GUI 30 to perform an associated anchored pointer action list. As illustrated in the table entry, an anchored pointer is performed by pressing and releasing the right "Shift" keyboard key, followed by the alphanumeric identification key of the pointer.

The Delete All function specified in the table 102 permits a user to immediately cause the system to delete all anchored and movable pointer-key bindings that were defined during the present invocation of the GUI 30 and pointer system. In the preferred embodiment, the system user can select a configuration in which the pointer-key bindings are automatically saved when an application is closed or can select a configuration in which the bindings are deleted when an application is closed. If the user selects automatic saving of the pointers, then they are saved until the user deletes them. That is, the pointers will be saved even when the user quits the GUI or re-boots the operating system. The GUI can recall pointer-key bindings by associating them with a user log-in identification code. This feature can be implemented on a network system to save and recall pointer bindings to accommodate multiple users who may want separate pointer-key bindings that can be recalled at any computer location of the network.

The multi-context Select features listed in the table 102 illustrates that the GUI 30 permits moving from a pointer in a first application to a pointer in a second application if the second application is currently active in the GUI. That is, if a user is controlling a pointer in a first application, and then presses the left shift key followed by an alphanumeric key that identifies a movable pointer in another application, then the GUI will shift the active window to the second application and control will pass to the identified movable pointer. A better understanding of the GUI pointer functions will be gained from a description of implementations that illustrate particular applications.

For example, those skilled in the art will recognize that, with most graphical user interface programs, placing a pointer above a program icon and pressing the "Enter" button on the keyboard, or clicking the left mouse button twice, will launch the program associated with the icon. If a user wants to define an anchored pointer to launch a program, the user can place the default pointer on a program icon, press the Control key to initiate the definition phase of the GUI 30, press the alphanumeric key by which the pointer will later be referenced, and then press the "Enter" button on the keyboard. This sequence of key pressing will place data corresponding to a press of the "Enter" button into the action column of the table 102. When the user wants the action executed, the user simply presses the keyboard right shift key, releases it, and then presses the identifying alphanumeric key. The GUI 30 automatically retrieves the action information, including the location of the anchored pointer, and thereby causes the associated program launch to occur.

Alternatively, the user can launch a program by pressing the mouse button twice after locating the pointer over the program icon. During the definition phase, this would require an action of pressing the mouse button once, followed by the append command of pressing the keyboard "Ctrl" key, pressing the identifying alphanumeric key, followed by another press of the mouse button. This sequence of keystrokes places data corresponding to two mouse button presses in the action table. In this way, when the user recalls or selects the anchored pointer, the appropriate data is retrieved from the action list and is executed. This permits a user to launch desired application programs using the anchored pointers.

Figure 10:
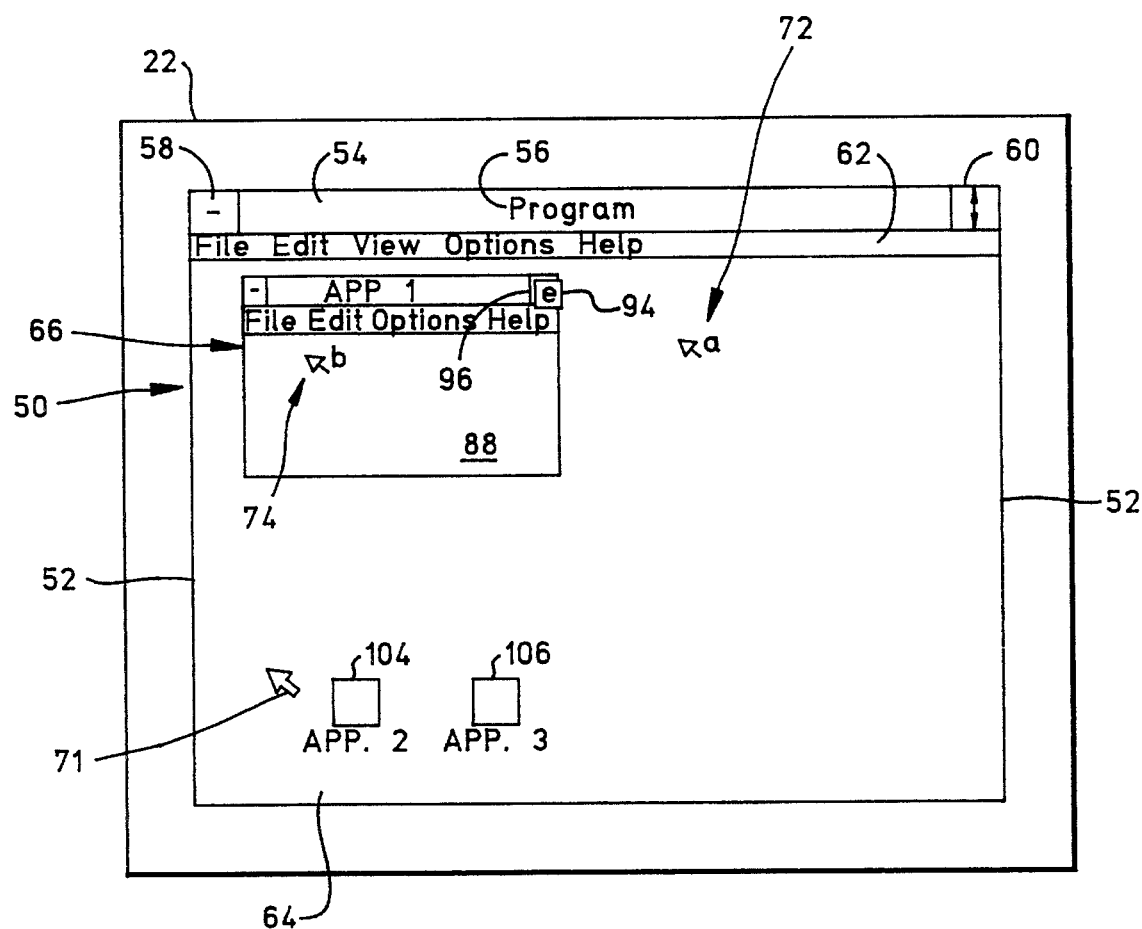
FIGS. 10 and 11 are display representations illustrating implementation of the movable pointers of the system illustrated in FIG. 1.
Figure 11:
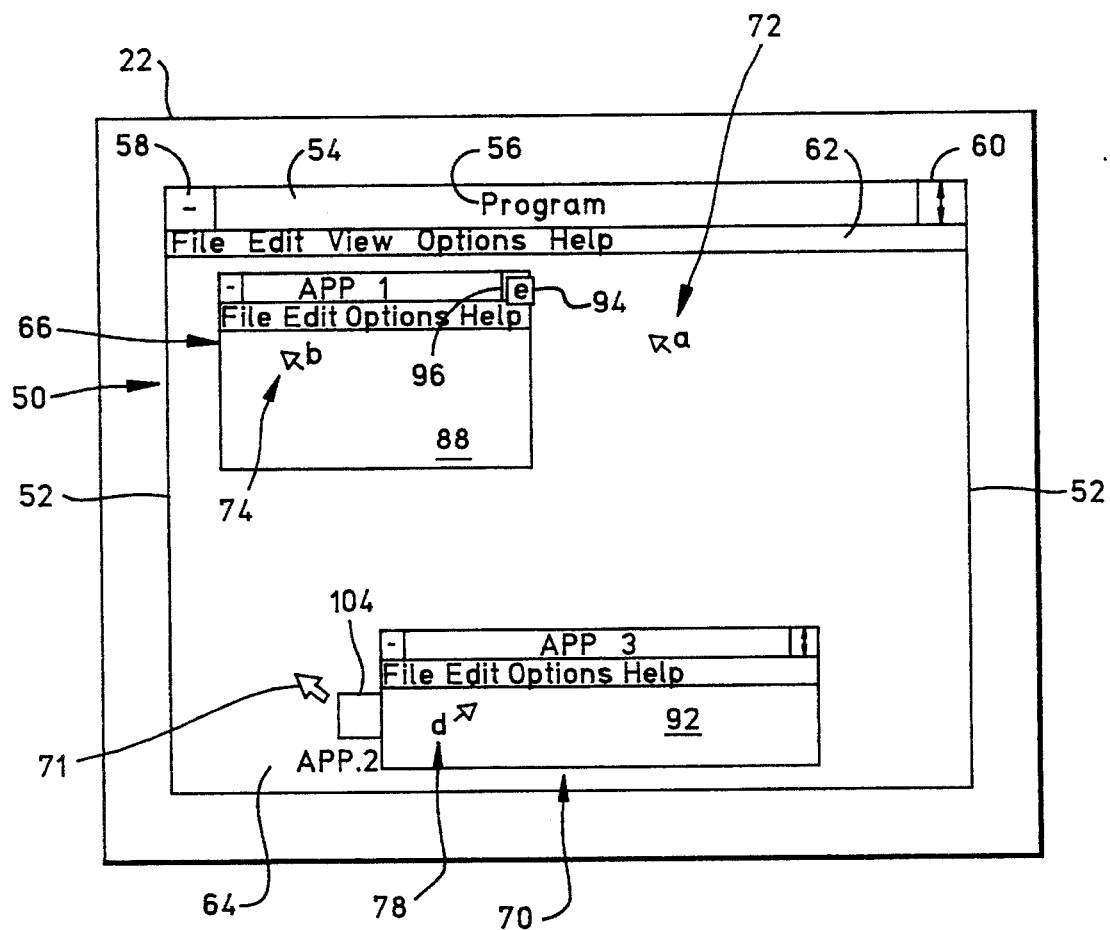

A further understanding of the multiple pointers and anchored pointers can be gained with reference to the display window representations of FIGS. 10–13. FIGS. 10 and 11 relate to the "switch to" function of the multiple pointers. FIG. 10 is a representation of the program window 50 with a workspace 64 in which the first application window 66 is located and in which the second and third application windows illustrated in FIG. 6 have been reduced to the size of respective icons 104, 106. FIG. 11 illustrates how the GUI can switch operations so that a previously defined pointer can be made the active pointer.

In FIG. 10, either one of the default pointer 71, the movable pointer 72 in the program workspace 64, or the movable pointer 74 labelled "b" in the first application workspace 88 can be designated the active pointer, meaning that user movement of the display mouse 24 (FIG. 1) causes movement of the active pointer on the display 22. Using the switch to function of the GUI 30, the user specifies the movable pointer 78 labelled "d" located in the workspace 92 of the third application window 70 (FIG. 6). Because the third application window is active, though reduced to the size of an icon 106 in FIG. 10, when the user switches to the "d" movable pointer, the GUI finds the "d" pointer definition (including its location) in the pointer context table 80, expands the third application window to its full size 70, and transfers the active pointer (the pointer being controlled by the user) to the "d" pointer 78. The display 22 then appears as depicted in FIG. 11.

Figure 12:
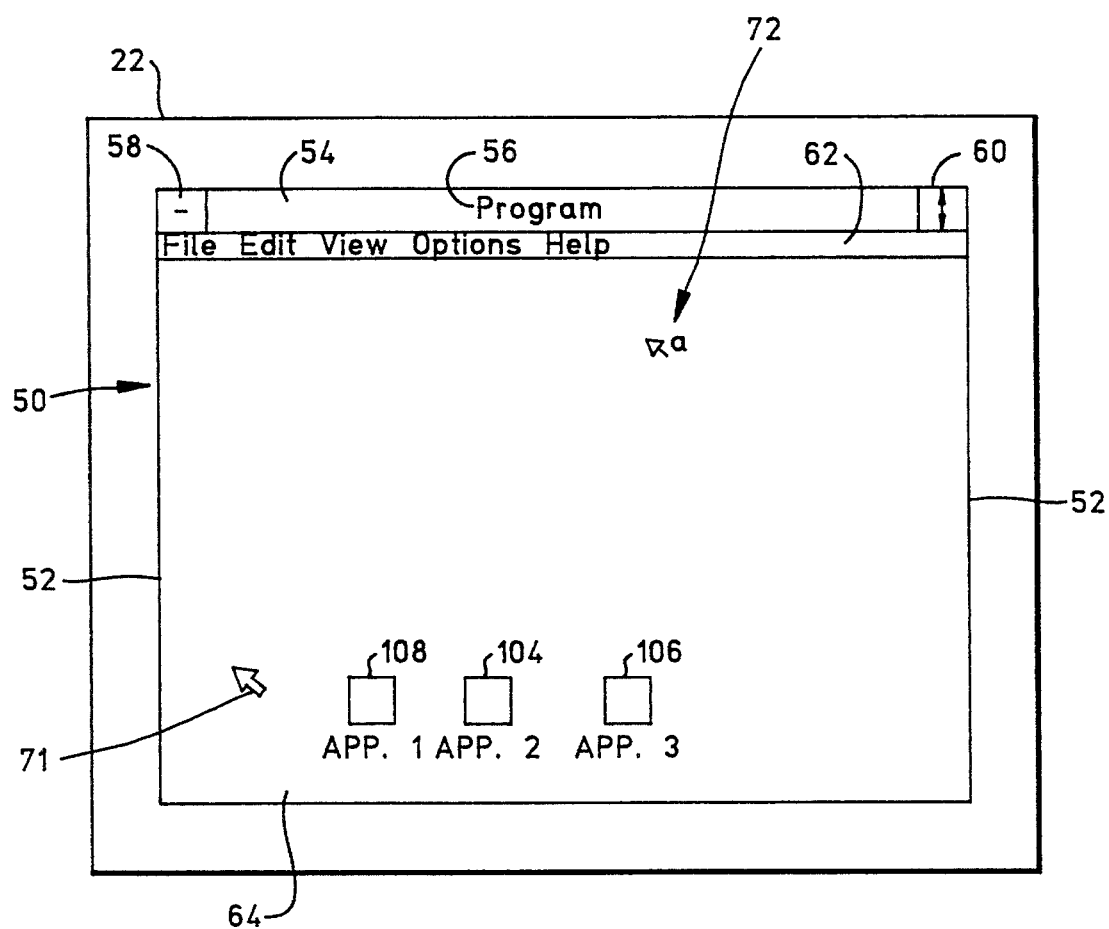
FIGS. 12 and 13 are display representations illustrating implementation of the anchored pointers in the system illustrated in FIG. 1.
Figure 13:
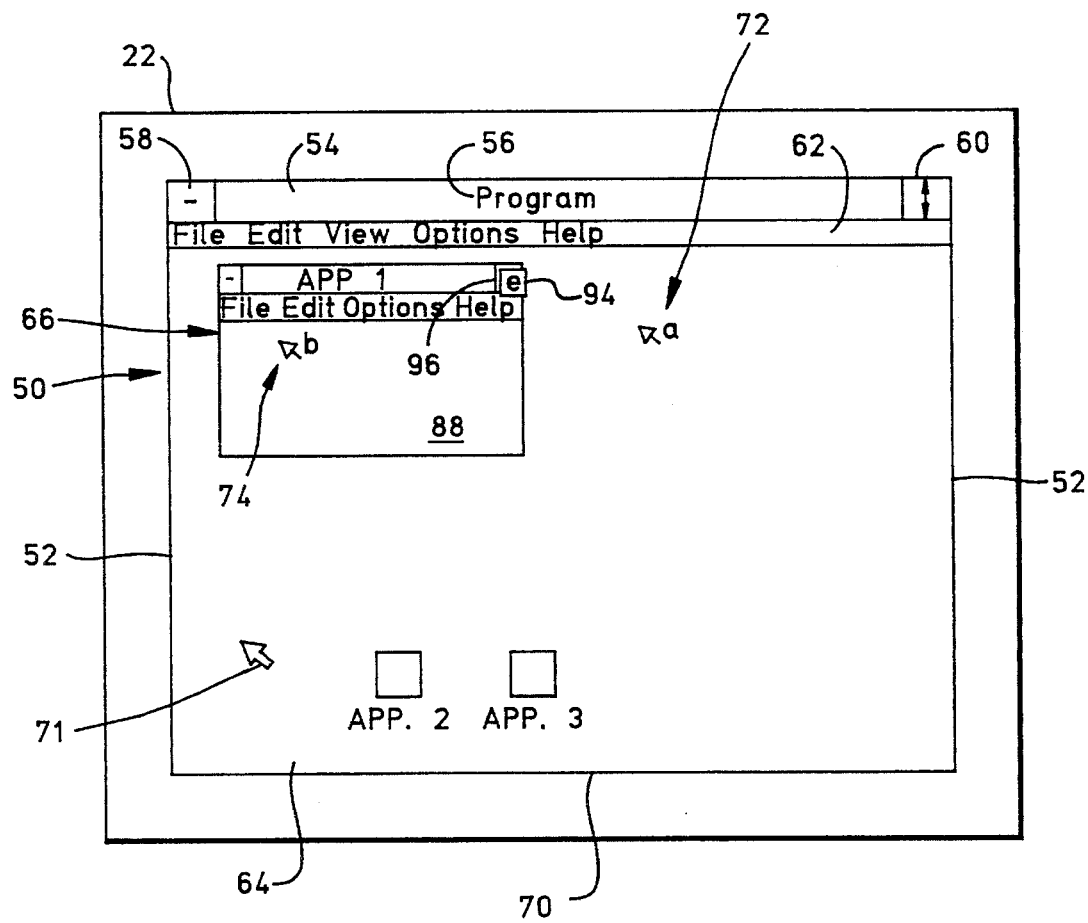

FIGS. 12 and 13 illustrate the feature of performing an anchored pointer. FIG. 12 is a representation of the program window 50 with the first, second, and third application windows 66, 68, 70 illustrated in FIG. 6 having been reduced in size to icons 108, 104, 106, respectively. As illustrated in FIG. 6, the first application window includes an anchored pointer 94 labelled "e" placed on the sizing icon 96 of the window. FIG. 13 illustrates the result of the user performing the "e" anchored pointer from the display of FIG. 12. The anchored pointer "e" in FIG. 6 has a user action corresponding to two button clicks or a press of the "Enter" button on the keyboard. As known to those skilled in the art, because the anchored pointer 94 is placed approximately on the sizing icon of the first application window, the action will cause the display window of the application to become enlarged. In particular, when the user specifies the "e" anchored pointer, the GUI 30 finds the pointer in the pointer context table 80, finds the action list 100, and executes the specified action. In this way, the first application window is expanded to the size depicted in FIG. 13. Thus, FIG. 13 shows the second application window in its enlarged condition after the user has selected the anchored pointer "e" from the display illustrated in FIG. 12.

The preferred embodiment described above has been illustrated with respect to a window operating environment. It should be understood, however, that the multiple pointers provided by the present invention also can be provided in the context of a non-window operating environment. Although the basic operation of the pointers would remain the same, some details would be modified. For example, the pointer context table would not include window identification information, as described above. Those skilled in the art will readily understand the additional departures from the illustrated embodiment that would be necessary in a non-window operating environment, and therefore further detailed explanation is not necessary.

Figure 14:
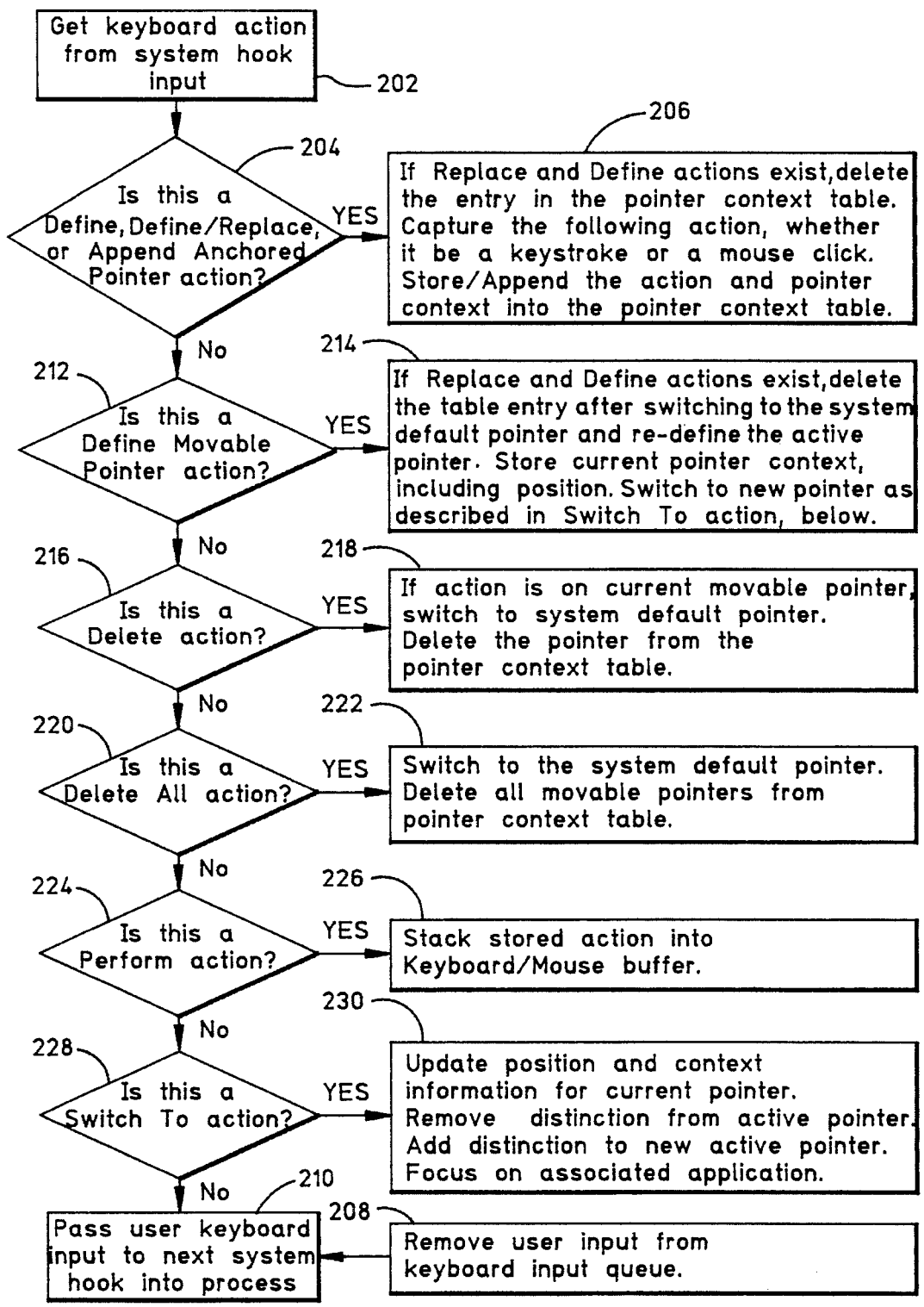
FIG. 14 is a flow diagram representing the processing of the system illustrated in FIG. 1.

FIG. 14 is a flow diagram that represents the processing of keyboard input by the system illustrated in FIG. 1. The processing begins at the flow diagram box numbered 202 when the system receives keyboard action from a system hook input. Those skilled in the art will recognize that a system hook input is used by a graphical user interface to provide user keyboard keystrokes or mouse input movements to a requesting process or application and then to pass the input along to a next requesting process or application. After the user input is obtained at the box numbered 202, processing of the input begins at the flow diagram box numbered 204, where the system determines if the input was for a Define or Append action with respect to an anchored pointer (see FIG. 9 and the accompanying text).

If the user keyboard action was for an anchored pointer Define, Define with Replace, or Append, an affirmative outcome at box 204, then processing proceeds with the flow diagram box numbered 206. At box 206, the system deletes the pointer context table entry corresponding to the anchored pointer if the Replace and Define functions exist. The system then captures the following action, whether it is a keystroke or mouse click. Finally, the system stores and/or appends the action and pointer context into the pointer context table. Processing then proceeds at the flow diagram box numbered 208, where the system removes the user input from the keyboard input queue (the system hook input). That is, the user keyboard pointer control input itself is removed so it is not processed by other processes or applications requesting the system hook input. Thus, in the case of the Perform function, only stacked data will remain in the input queue. Processing then proceeds at the flow diagram box numbered 210, where the system passes the keyboard input to the next process requesting the system hook input.

Continuing with processing of the keyboard input, if the input was not an anchored pointer Define, Define/Replace, or Append action at the box numbered 204, then processing resumes at the flow diagram box numbered 212, where the system checks to determine if the input was for a Define Movable Pointer action. If the input was, then processing proceeds at the flow diagram box numbered 214. At the box numbered 214, the system determines if the Replace and Definition functions exist and, if so, deletes the pointer context table entry after switching the system default pointer to redefine the active pointer. Next, the system stores the current pointer context into the pointer context table and switches to the new pointer as described in the Switch To function. Processing then proceeds to the flow diagram box numbered 208 for further system hook input processing, as described above.

If the keyboard input was neither an anchored pointer Define/Append function nor a Define Movable Pointer function, then at the flow diagram box numbered 216 the system checks to see if the input was for a Delete action. If the input was for a Delete action, then at the flow diagram box numbered 218 the system switches to the system default pointer if the Delete action was on the current movable pointer. The system then deletes the pointer structure from the pointer context table. Again, user input processing then resumes at the flow diagram box numbered 208.

If the check for a Delete action at box 216 was negative, then at the flow diagram box numbered 220 the system checks to determine if the keyboard input was for a Delete All action. If it was, then at the flow diagram box numbered 222 the system switches to the system default pointer and deletes all movable pointer structures. Processing then resumes at the flow diagram box numbered 208.

Next, the system checks to determine if the keyboard input was for a Perform action at the box numbered 224 and, if it was, then at box 226 the system stacks the stored action into the keyboard/pointer buffer for interpretation, in accordance with conventional graphical user interface keyboard/ mouse interrupt processing. System processing resumes with the flow diagram box numbered 208, as described above.

The last multiple pointer-related function to be checked, represented by the conditional box numbered 228, is for the keyboard input to be a Switch To action. If no pointer control input was received, a negative outcome at box 228, then processing of the system hook input proceeds at the box numbered 208. If the system hook input is for a Switch To action, then processing proceeds with the flow diagram box numbered 230, where the system first updates the position and context information for the current display pointer, removes the distinguishing characteristic of the active pointer described above (such as removing the highlighting of the pointer or reducing the size of the pointer to equal those of other inactive pointers), and then highlights the new pointer or otherwise renders it distinctive, as described above. The system then brings the window for the associated application to the front of the display screen, which is commonly referred to as having the GUI focus on the associated application. Processing then resumes with the flow diagram box numbered 208, as described above.

Figure 15:
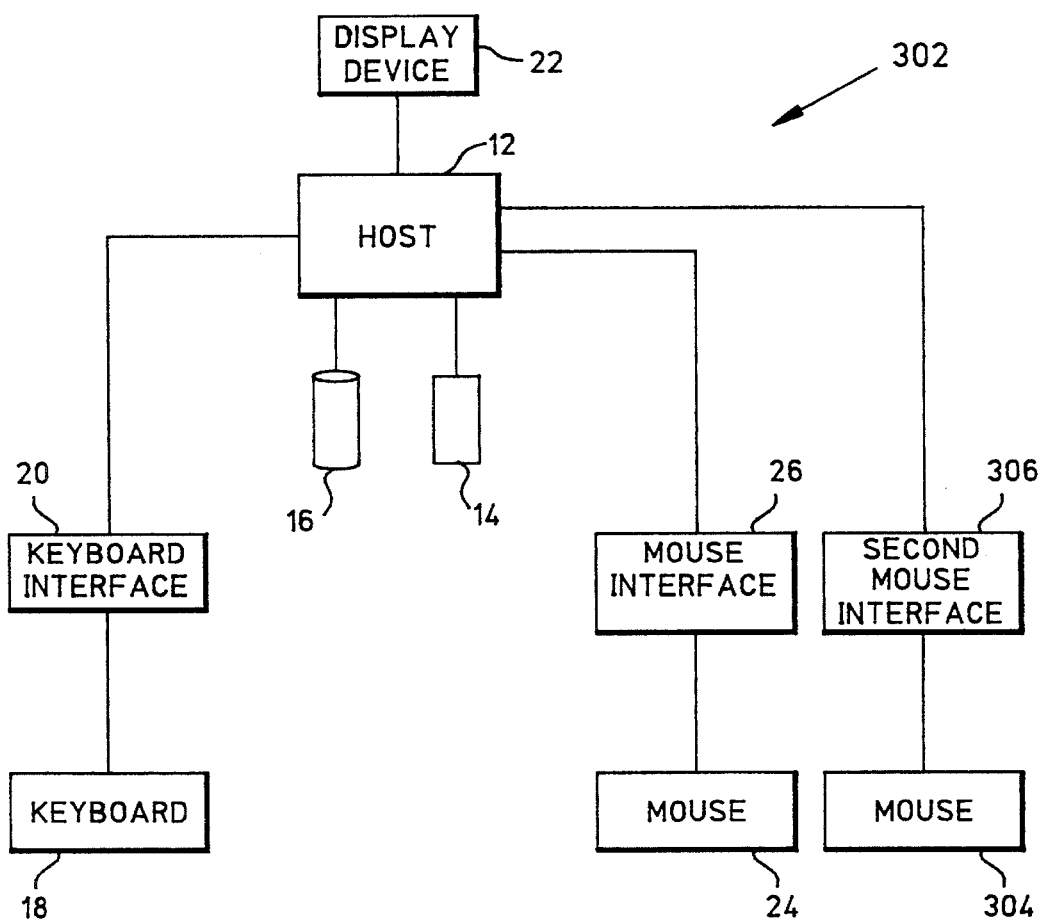
FIG. 15 is a block diagram of a computer system constructed in accordance with an alternative embodiment of the present invention that supports multiple pointing devices.

The computer system illustrated in FIG. 1 and described above provides a convenient means for defining and controlling multiple display pointers with a single pointing device. It also can be advantageous to control multiple pointers with multiple pointing devices. FIG. 15 illustrates a computer system 302 having some components in common with the system illustrated in FIG. 1. These common components have common reference numerals shared with FIG. 1. Thus, the FIG. 15 system includes a first display pointer control device 24, but also includes a second display pointer control device 304 and associated second device driver 306. In this way, the system 302 permits a user to define multiple pointers that are associated with the first pointing control device 24 or the second device 304, or to share pointers between the two pointing control devices.

Those skilled in the art will readily understand that the pointer context table for the multiple pointer control device system 302 of FIG. 15 would include additional information as compared with the pointer context table 80 described above for the single pointing device system. In particular, the multiple pointer context table would include information specifying the individual pointer control device that "owned" the pointer. In this way, only the pointer control device identified as owning a particular pointer could be used to move that pointer. As noted, more than one pointer control device could be identified as owning particular pointers, if desired.

The present invention has been described above in terms of a presently preferred embodiment so that an understanding of the present invention can be conveyed. There are, however, many configurations for computer display pointer systems not specifically described herein but with which the present invention is applicable. The present invention should therefore not be seen as limited to the particular embodiment described herein, but rather, it should be understood that the present invention has wide applicability with respect to pointer systems generally. All modifications, variations, or equivalent arrangements that are within the scope of the attached claims should therefore be considered to be within the scope of the invention.

We claim:

1. A computer system having:

a host processor;

a display device;

an operating system that permits applications to be opened and represented on the display device, produces one or more display pointers on the display device that can be moved about in the displayed applications, and permits one of the display pointers to be designated an active pointer; and at least one pointer control device that controls movement of the display pointers and that includes a control button that can be actuated on a display feature after a display pointer is moved to the designated display feature;

wherein the operating system associates each defined display pointer with a pointer context comprising a particular application title and location of the display pointer within that application;

wherein the operating system recalls the pointer context when the user returns to the active application for which there are one or more previously defined display pointers; and wherein the system receives a user-designated single alphanumeric character with which a display pointer is associated and displays the alphanumeric character in close proximity to the associated display pointer on the display screen;

the system further including:

a pointer context table addressed by the alphanumeric character that is maintained by the operating system such that the application title and pointer location are added to the pointer context table when a pointer is defined, thereby associating the display pointer with its pointer context;

wherein the operating system responds to the user specifying a pointer identifying alphanumeric character by switching the computer system from the present active pointer to the specified pointer; and wherein the operating system responds to a user-selected pointer identifying character by changing the current application and pointer to the application and pointer specified by the table entry if there is a corresponding table entry for the identifying alphanumeric character; and creates a pointer context entry for a pointer identifying character if the user attempts to switch to the character and there is no display pointer presently associated with that character.

2. A computer system as defined in claim 1, the operating system associates a display pointer with a pointer context by:

determining the application title and pointer location of the application in which the display pointer is located; and storing the application title and pointer location in a pointer context table according to one of a plurality of pointer identifying alphanumeric characters.

3. A pointer control system for use in a computer system having a host processor, a display device, and an operating system that permits applications to be opened and represented on the display device, the pointer control system comprising:

display driver means for permitting a computer system user to define and identify multiple display pointers on the display device that can be moved about in the displayed applications by a pointer control device and for permitting one of the display pointers to be designated an active pointer; and graphical interface control means for associating each display pointer with a pointer context comprising a particular application title and location of the display pointer within that application and recalling the pointer context when the user returns to the active application for which there are one or more previously created display pointers;

wherein the system receives a user-designated single alphanumeric character with which a display pointer is associated and displays the alphanumeric character in close proximity to the associated pointer on the display screen further including:

a pointer context table addressed by the pointer identifying keyboard character and maintained by the graphical interface control means such that the application title and pointer location are added to the pointer context table when a display pointer is defined, thereby associating the display, pointer with its pointer context;

wherein the graphical interface control means responds to the user specifying a pointer identifying character by designating the specified pointer to be the present active pointer; and wherein the graphical interface control means responds to a user-selected pointer identifying character by changing the current application and pointer to the application and pointer specified by the table entry if there is a corresponding table entry for the pointer identifying character and creates a pointer context entry for a pointer identifying character if the user attempts to switch to the character and there is no display pointer presently associated with that character.

4. A pointer control system as defined in claim 3, wherein the graphical interface control means associates a display pointer with a pointer context by:

determining the application title and pointer location of the application in which the display pointer is located; and storing the application title and pointer location in a pointer context table according to one of a plurality of pointer identifying keys.

\* \* \* \* \*

UNITED STATES PATENT AND TRADEMARK OFFICE
CERTIFICATE OF CORRECTION

PATENT NO. : 5,586,243
DATED : December 17, 1996
INVENTOR(S) : Barber et al

It is certified that error appears in the above-indentified patent and that said Letters Patent is hereby corrected as shown below:

Column 16, line 19, delete "," to

Signed and Sealed this

Twenty-third Day of June, 1998

Attest:

BRUCE LEHMAN

Attesting Officer Commissioner of Patents and Trademarks